United States Patent [19]
Hong

[11] Patent Number: 5,423,937
[45] Date of Patent: Jun. 13, 1995

[54] DEVICE FOR MAKING BLIND HAVING Y-SHAPED PLEATS

[76] Inventor: Amy Hong, No. 9, Jenn-Shing Lane, Fu-Nan Village, Fu-Shing Hsiang, Changhua Shiann, Taiwan, Prov. of China

[21] Appl. No.: 71,408

[22] Filed: Jun. 4, 1993

[51] Int. Cl.⁶ .................. B32B 31/24; B32B 31/28
[52] U.S. Cl. .................. 156/379.8; 156/73.1; 156/200; 156/204; 156/227; 156/272.2; 156/275.1; 156/474; 156/539; 156/543; 156/580.1
[58] Field of Search ............... 156/73.1, 91, 204, 227, 156/272.2, 379.8, 459, 474, 539, 543, 580.1, 200, 275.1; 428/181; 160/84.1 R, 84.1 C, 84.01, 84.04

[56] References Cited
U.S. PATENT DOCUMENTS
5,120,376  6/1992  Hong .................. 156/204 X Primary Examiner—Adrienne Johnstone
Attorney, Agent, or Firm—Browdy and Neimark

[57] ABSTRACT

A device for making a blind having Y-shaped pleats comprises an ultrasonic welding gear or a high frequency welding gear, a pressing wheel, a base plate, a motor, two drive wheels, two guide wheels, and two guide brackets. The welding gear has a weld head over which the pressing wheel is mounted for pressing a blind cloth against the weld head. The base plate is disposed horizontally between the pressing wheel and the weld head and provided with a through hole corresponding in location to the pressing wheel and the weld head. The motor is used to drive the pressing wheel which in turn drives the two drive wheels to press the blind cloth moving on the base plate. The two guide wheels are driven by the motor for guiding the unwelded blind cloth to move. The guide brackets are provided respectively with a protruded portion corresponding in level to the base plate for holding the pleats of the blind cloth waiting to be welded.

8 Claims, 7 Drawing Sheets

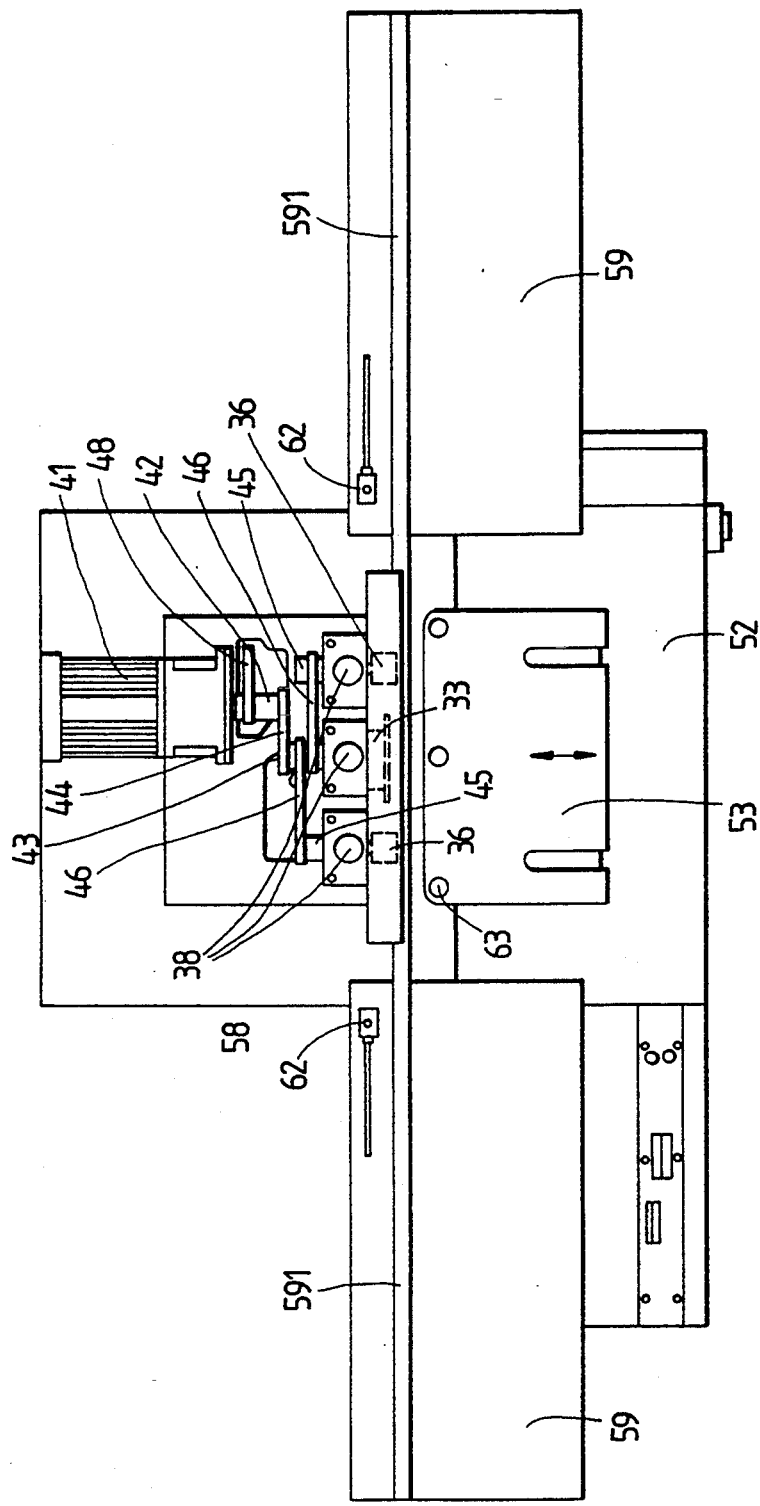

DEVICE FOR MAKING BLIND HAVING Y-SHAPED PLEATS

FIELD OF THE INVENTION

The present invention relates to a blind making machine, and more particularly to a device for making a blind having Y-shaped pleats.

BACKGROUND OF THE INVENTION

As shown in FIG. 1, a pleated blind 10 of the prior art has a blind cloth 11 provided with a plurality of through holes 12 through which a string 13 is disposed. The blind cloth 11 is defective in design in that it can not keep out the light completely because of the through holes 12, which can be also used improperly as peep holes.

Another prior art blind 20 having Y-shaped pleats is intended for overcoming the defects of the prior art pleated blind 10 described previously. The blind 20 has a blind body 21 provided with a plurality of pleats and with a plurality of shoulders 22 located on the same side of the blind body 21. Each of the shoulders 22 is provided with a through hole 23 through which a string 24 is put. The blind body 21 is therefore capable of keeping out the light completely.

This applicant invented an automatic machine for making a blind having a plurality of Y-shaped pleats. The machine is protected respectively by the Taiwanese Patent No. 50182 and the U.S. Pat. No. 5,120,376. However, such an automatic machine is not suitable for use in a factory in which the pleated blind is made in a relatively small quantity, because the automatic machine is expensive.

SUMMARY OF THE INVENTION

It is therefore the primary objective of the present invention to provide a semiautomatic device for making economically a blind having a plurality of Y-shaped pleats. Such a semiautomatic device is suitable for use in making economically the pleated blinds on a small scale.

In keeping with the principles of the present invention, the foregoing objective of the present invention is attained by a device which comprises an ultra-sonic welding mechanism or a high frequency welding mechanism, a pressing wheel, a base plate, a motor, two drive wheels, two guide wheels, and two guide brackets. The welding mechanism has a weld head away from which the pressing wheel is mounted for pressing a blind cloth against the weld head. The base plate is disposed orthogonally between the pressing wheel and the weld head and provided with a through hole corresponding in location to the pressing wheel and the weld head. The motor is used to drive the pressing wheel. The two drive wheels are mounted respectively at a first side and a second opposite side of the pressing wheel and away from the base plate on the pressing wheel side of the base plate. The two drive wheels are caused to turn synchronously along with the pressing wheel so as to hold and press the blind cloth which is moved on the base plate. The two guide wheels are mounted respectively to a first side and a second opposite side of the weld head corresponding to the first side and the second opposite side of the pressing wheel, and away from the base plate on the weld head side of the base plate. The two guide wheels are driven by the motor to turn synchronously along with the pressing wheel for guiding the unwelded blind cloth to move. The two guide brackets are mounted respectively to a first side and a second opposite side of the base plate corresponding to the first side and the second opposite side of the pressing wheel and of the weld head and provided respectively a protruded portion corresponding in level to the base plate for holding the pleats of the blind cloth waiting to be welded.

BRIEF DESCRIPTION OF THE DRAWINGS

FIG. 6 shows a top plan view of the present invention.

DETAILED DESCRIPTION OF THE INVENTION

Figure 1:
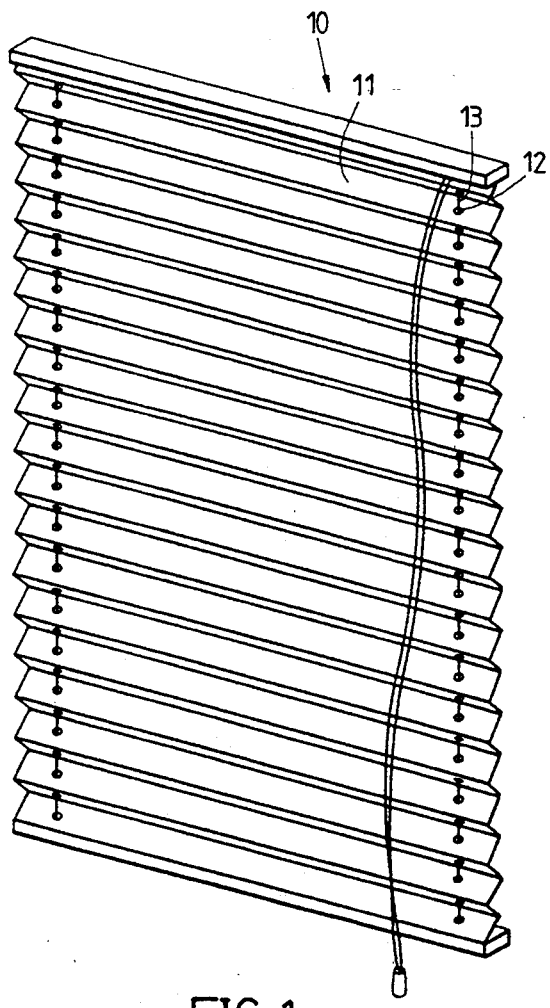
FIG. 1 shows a perspective view of a pleated blind of the prior art.
Figure 2:
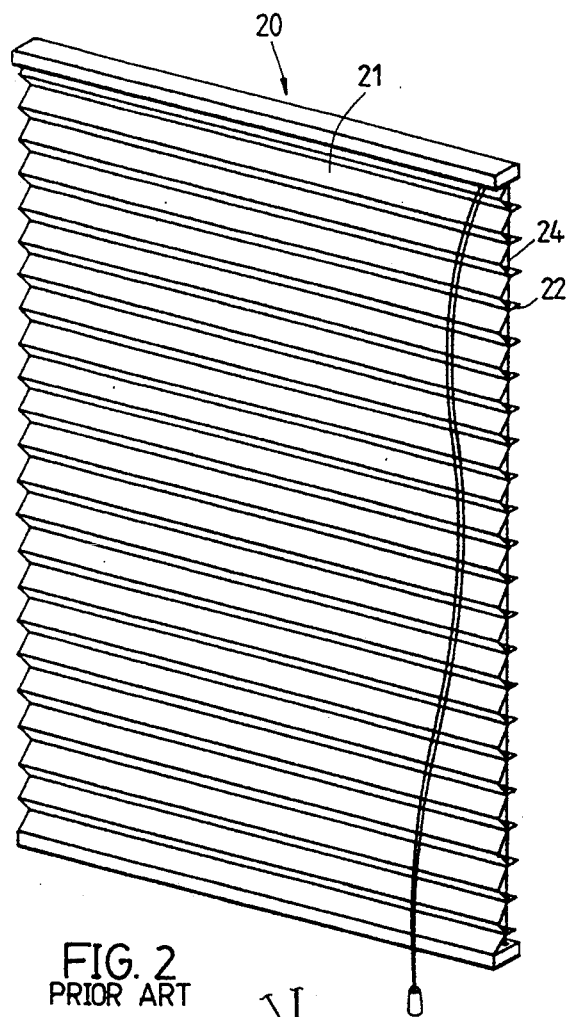
FIG. 2 shows a perspective view of a prior art blind having a plurality of Y-shaped pleats.
Figure 3:
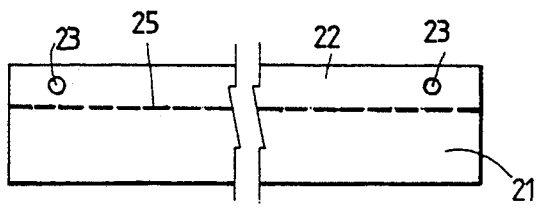
FIG. 3 shows a top plan view of the prior art blind as shown in FIG. 2.
Figure 4:
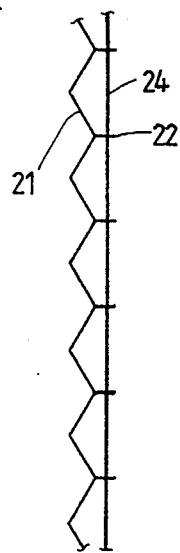
FIG. 4 shows a side elevational view of the prior art blind as shown in FIG. 2.

The device of the present invention is employed to weld along the dotted line 25 the pleats of the prior art blind cloth 11, as shown in FIG. 3, so that the blind body 21 having a plurality of Y-shaped pleats is formed.

Figure 5:
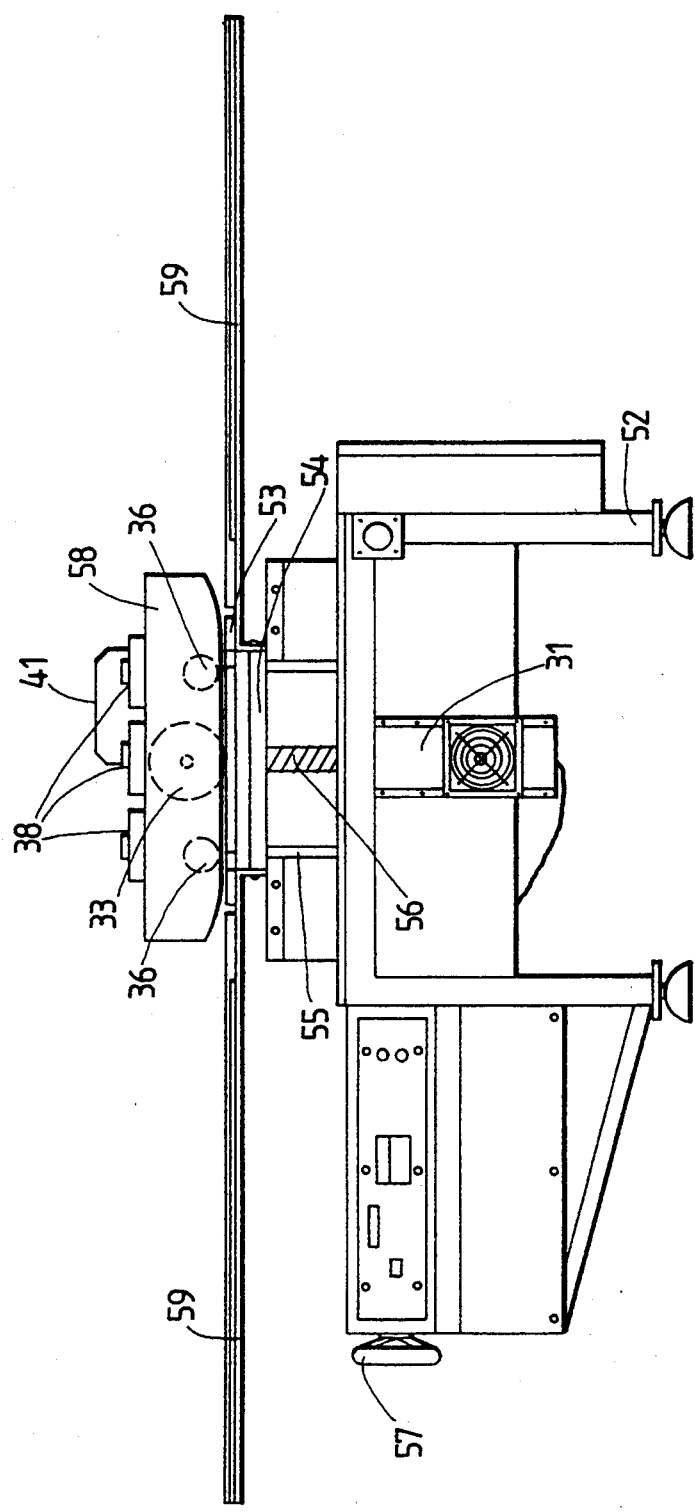
FIG. 5 shows a front elevational view of the present invention.
Figure 8:
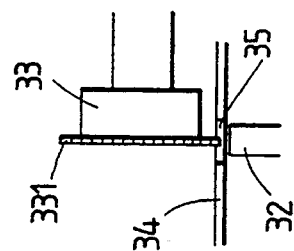
FIG. 8 is a schematic view showing a positional relationship among the pressing wheel, the base plate and the weld head, according to the present invention.

Now referring to FIGS. 5 and 8, the device of the present invention is shown to comprise a pressing wheel 33 which is mounted over a weld head 32 of an ultrasonic or high frequency welding mechanism 31. The pressing wheel 33 is provided on the outer edge thereof with a tooth 331. The pressing wheel 33 is driven to turn in conjunction with the feeding of the blind cloth 11 so that the welding takes place along the dotted line 25 located at a predetermined position in the inner side of each of the folds of a series of pleats. Located between the weld head 32 and the pressing wheel 33 is a base plate 34 for keeping the blind cloth 11. The base plate 34 is provided with a through hole 35 corresponding in location to the tooth 331 of the pressing wheel 33. When the blind cloth 11 is guided to pass under the pressing wheel 33, the folds of the blind cloth 11 are welded one by one at the time when the blind cloth 11 is pressed between the weld head 32 and the tooth 331 of the pressing wheel 33.

As shown in FIGS. 5, 6, 9 and 10, two drive wheels 36 are mounted respectively to the left and the right sides of the pressing wheel 33 and over the base plate 34. Both drive wheels 36 are linked with the pressing wheel 33 so that the drive wheels 36 can be driven by the pressing wheel 33 to rotate synchronously and in the same direction. Located between the two drive wheels 36 and the base plate 34 is a clearance of a height dependent on the thickness of the blind cloth 11. As a result, the central axes of the two drive wheels 36 and the pressing wheel 33 must be pivoted to an adjusting mount 38 so that the distances among the drive wheels 36, the pressing wheel 33 and the base plate 34 can be adjusted. Located under the base plate 34 are two guide wheels 39, which are mounted respectively to the left and the right of the weld head 32 and which are corresponding in location to the drive wheels 36. The guide wheels 39 are fastened with three endless belts 40, with the weld head 32 being situated within a space defined by the endless belts 40.

The two guide wheels 39 are caused to turn synchronously by means of the endless belts 40.

Figure 10:
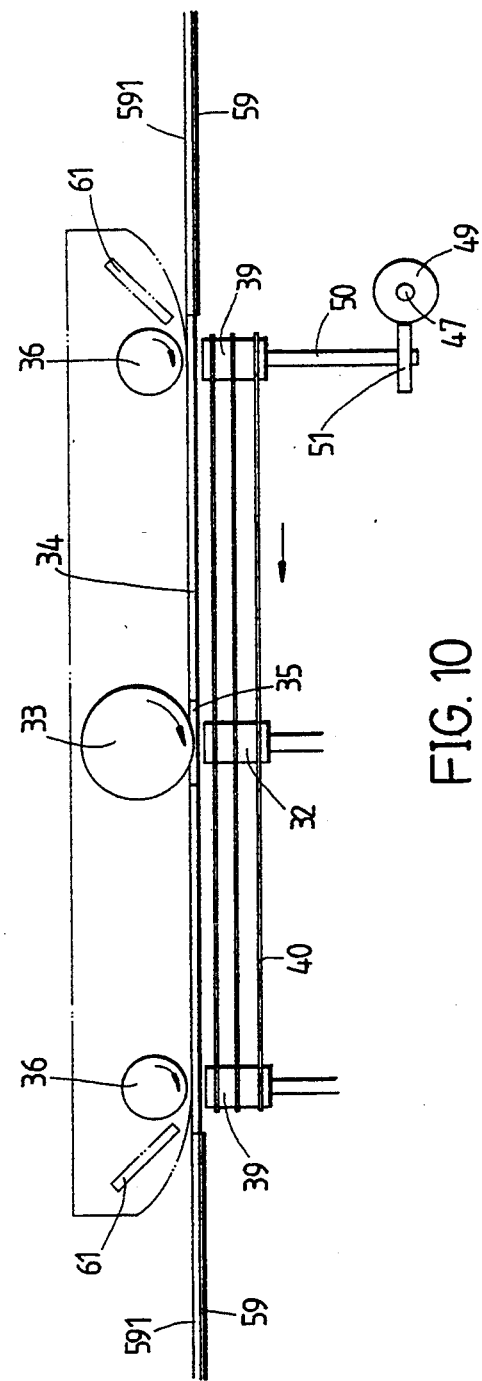
FIG. 10 is a front schematic view showing the positions where the pressing wheel, the two drive wheels, the base plate, the two guide wheels and the weld head are disposed, according to the present invention.
Figure 11:
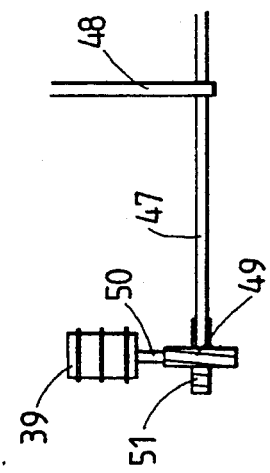
FIG. 11 is a schematic view showing the positions where the transmission shaft and the guide wheels are mounted, according to the present invention.

The driving mode of the present invention is illustrated in FIGS. 6, 7, 9, 10 and 11. The device of the present invention is provided with a motor 41 having a central axis 42. Located between the central axis 42 of the motor 41 and the central axis 43 of the pressing wheel 33 is a sprocket and chain set 44. In the meantime, a sprocket and chain set 46 is disposed respectively between the central axis 43 of the pressing wheel 33 and the central axes 45 of the two drive wheels 36. The motor 41 is used to drive the pressing wheel 33, which in turn drives the two drive wheels 36 to turn synchronously and in the same direction. As shown in FIG. 11, a sprocket and chain set 48 is disposed between the central axis 42 of the motor 41 and a transmission shaft 47 having a worm gear 49 fastened thereto. The worm gear 49 engages a worm gear 51 fastened to a central axis 50 of the guide wheel 39. As a result, the guide wheel 39 can be driven to turn synchronously.

Figure 7:
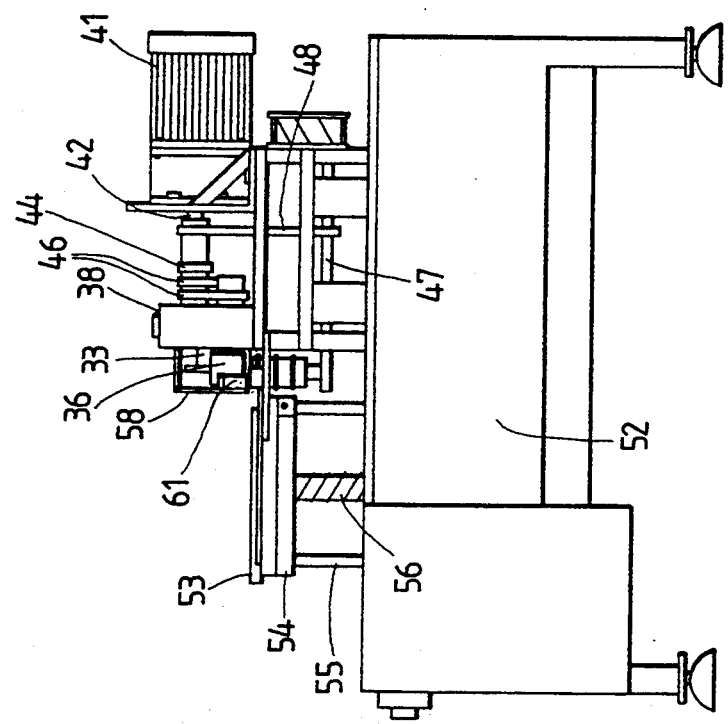
FIG. 7 shows a right elevational view of the present invention.
Figure 9:
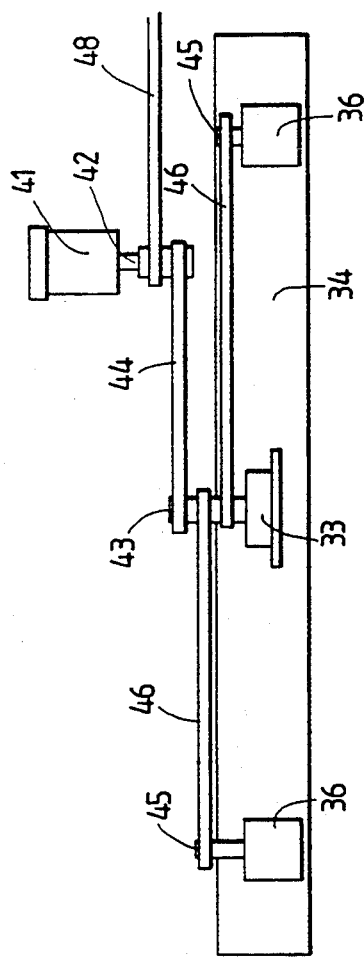
FIG. 9 is a top schematic view showing the positions where the pressing wheel, the base plate, the two drive wheels and the motor are disposed, according to the present invention.

As shown in FIGS. 5, 6 and 7, the components described above are mounted on a stand 52, which is provided with a movable plate 53 located parallel with and in front of the base plate 34. The movable plate 53 has an edge facing the two guide wheels 39. The movable plate 53 is pivoted to a lifting seat 54 such that the movable plate 53 can be caused to move back and forth in the directions indicated by the arrows in FIG. 6. The lifting seat 54 is pivoted to the stand 52 by means of four guide rods 55. A threaded rod 56 is disposed under the four guide rods 55. A hand wheel 57 is mounted to the left side of the stand 52 for turning a shaft (not shown in the drawings.) A sector gear is fastened to one end of the shaft for driving another sector gear pivoted to the bottom of the stand 52. The latter sector gear is centrally provided with a threaded hole engageable with the threaded rod 56 for regulating the movement of the lifting seat 54. Located over the pressing wheel 33 and the two drive wheels 36 is a shield 58, which comprises therein a guide piece 61 located respectively on the left side and the right side thereof. The guide piece 61 has a higher outer end and an inner end adjacent to the bottom edge of the drive wheel 36. A guide bracket 59 is disposed respectively at the left side and the right side of the base plate 34. A contact switch 62 is disposed behind each of the two guide brackets 59.

Figure 13:
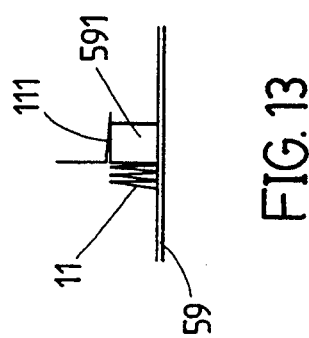
FIG. 13 is a schematic view showing an operation in which the blind body is kept on the guide brackets, according to the present invention.
Figure 14:
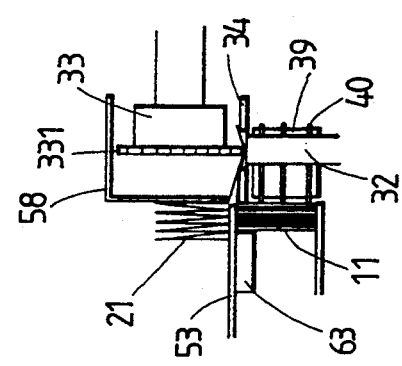
FIG. 14 is a schematic view showing an operation in which the blind body is welded, according to the present invention.
Figure 12:
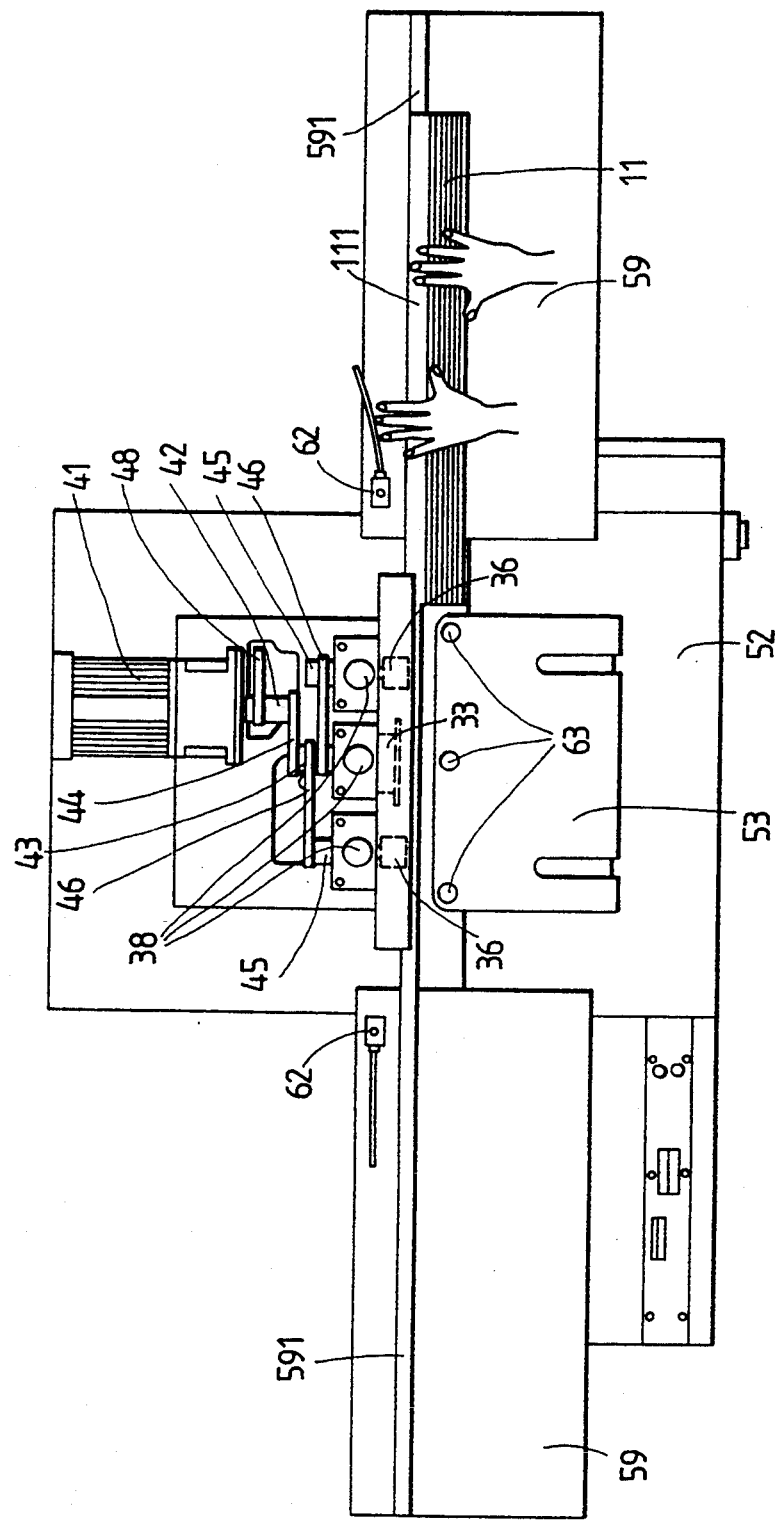
FIG. 12 shows a top plan view of the present invention at work.

The operation of the device of the present invention is illustrated in FIGS. 12, 13 and 14. The prior art blind cloth 11 is shown to be held by both hands of an operator. The blind cloth 11 has one side that is coated with an adhesive substance. The blind cloth 11 is placed on one of the two guide brackets 59. In this embodiment, the blind cloth 11 is placed on the right guide bracket 59, with the pleated portion 111 (which is to be welded) being arranged on the protruded portion 591 of the guide bracket 59 and with the rest of the blind cloth 11 being arranged in front of the protruded portion 591, as shown in FIG. 13. The blind cloth 11 is moved by hands toward the center of the device before the operator starts the motor 41 by touching the contact switch with the left hand. As a result, the pressing wheel 33, two drive wheels 36, two guide wheels 39 and three endless belts 40 are driven by the motor 41 to turn in the directions indicated by the arrows as shown in FIG. 10. The welding gear 31 is also actuated. The pleated portion 111 of the blind cloth 11 is guided at one end thereof by the guide piece 61 to locate itself under the right drive wheel 36. Thereafter, the pleated portion 111 is pressed by the drive wheel 36 while the pleated portion 111 is moved on the base plate 34 toward the pressing wheel 33. The rest of the pleated portion 111 that has not yet been welded is moved leftwards by the endless belt 40. The movable plate 53 is provided at the bottom thereof with a plurality of rollers 63 intended for use in sustaining the rest of the blind cloth 11 which has not been welded. The blind body 21 having the Y-shaped pleats is located over the movable plate 53 and moved along the outside of the shield 58. Upon the completion of the welding operation, the blind body is then moved to the left guide bracket 59. The welded portion of the blind body is then turned over with both hands of the operator, thereby causing the unwelded portion of the blind body to turn over too. The welded portion is held by both hands of the operator while the unwelded portion of the blind body is placed lightly on the protruded portion 591 of the left guide bracket 59 before the unwelded portion is moved toward the center of the device. The motor 41 is then started by the operator who uses his or her right hand to touch the contact switch. The entire device is then operated in reverse so as to hold securely the unwelded portion of the blind body and to cause the unwelded portion to move rightwards. In the meantime, a dotted line 25 is formed on the pleated portion by the weld head 32 which cooperates with the tooth 331 of the pressing wheel 33. The blind body 21 having a plurality of Y-shaped pleats is made by repeating the process described above.

The semi-automatic device of the present invention is so compact that it does not take up too much of the floor space. In addition, the device of the present invention can be easily operated by a worker who has had little training or experience. Furthermore, the device of the present invention is economically suitable for use in making a variety of pleated blinds of various colors, materials and sizes.

What is claimed is:

1. A device for making a blind having a plurality of Y-shaped pleats comprising:
    an ultrasonic welding gear having a weld head, or a high frequency welding gear having a weld head;
    a pressing wheel mounted rotatably away from said weld head such that said pressing wheel can press a blind cloth at such time when said blind cloth is welded by said weld head;

a base plate disposed orthogonally between said pressing wheel and said weld head and provided with a through hole corresponding in location to said pressing wheel and said weld head;

a motor for driving said pressing wheel;

two drive wheels mounted respectively away from said base plate on the pressing wheel side thereof and at a predetermined position to a first side and a second opposite side of said pressing wheel, with each of said two drive wheels being linked with said pressing wheel so as to press and hold said blind cloth moving on said base plate;

two guide wheels mounted respectively away from said base plate on the weld head side thereof and at a predetermined position to a first side and a second opposite side of said weld head corresponding to the first side and the second opposite side of said pressing wheel, with each of said two guide wheels being driven by said motor to turn synchronously along with said pressing wheel so as to guide an unwelded portion of said blind cloth to move synchronously; and two guide brackets disposed respectively at a predetermined position to a first side and a second opposite side of said base plate corresponding to the first side and the second opposite side of said pressing wheel and of said weld head, with each of said two guide brackets having a pressing wheel side surface provided thereon with a protruded portion corresponding in level to said base plate.

2. The device according to claim 1 wherein said two guide wheels are fastened with a plurality of endless belts.

3. The device according to claim 1 wherein said pressing wheel is provided with a tooth located on an outer edge thereof.

4. The device according to claim 1 wherein said pressing wheel and said two drive wheels are mounted pivotally and respectively on an adjusting mount by means of which a clearance between said pressing wheel and said base plate and a clearance between said two drive wheels and said base plate are adjusted.

5. The device according to claim 1 further comprising a stand provided thereon with a movable plate parallel with and to one side of said base plate, said movable plate having an edge facing said two guide wheels and being capable of moving back and forth toward and away from said two guide wheels so as to press said unwelded portion of said blind cloth against said two guide wheels.

6. The device according to claim 5 wherein said movable plate is mounted pivotally on a lifting seat.

7. The device according to claim 1 wherein said pressing wheel is driven by said motor by means of a sprocket and chain set mounted between a central axis of said motor and a central axis of said pressing wheel; wherein said two drive wheels are driven by said pressing wheel by means of a sprocket and chain set mounted between said central axis of said pressing wheel and a common central axis of said two drive wheels; and wherein said motor drives a transmission shaft by means of a sprocket and chain set.

8. The device according to claim 1 wherein said pressing wheel and said two drive wheels are provided with a shield mounted thereover.

* * * * *